A. & T. A. DE VILBISS.
CLOSURE FOR FLUID RECEPTACLES.
APPLICATION FILED OCT. 20, 1909.
Reissued Dec. 7, 1909.
13,049.
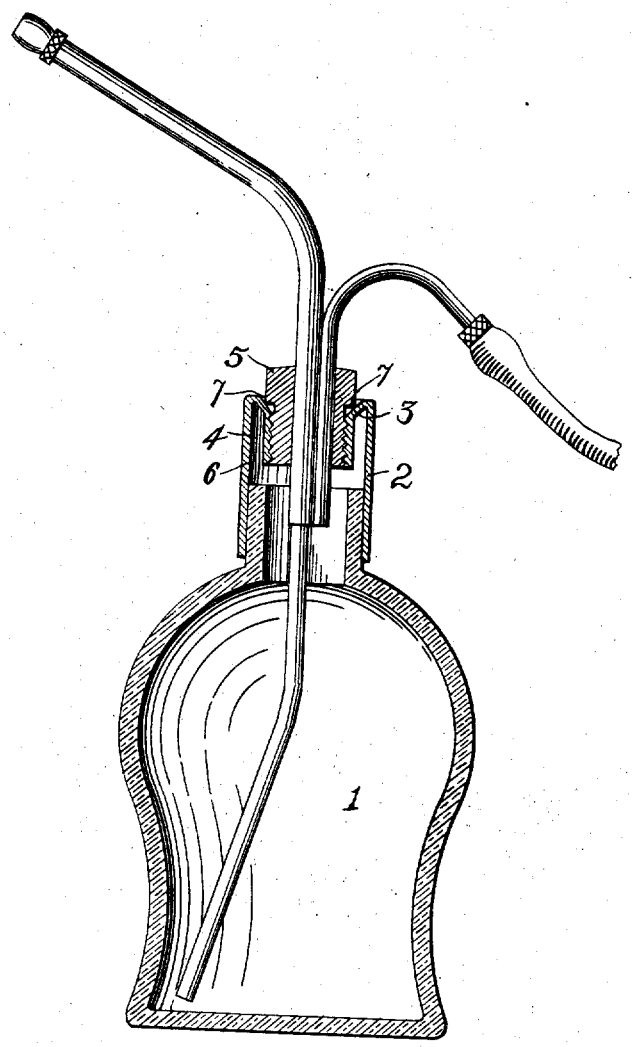
WITNESSES:
C. H. Bills
E. E. Thomas
INVENTOR.
Allen De Vilbiss,
Thomas A. De Vilbiss,
By Owen & Owen.
His attys.
ANDREW B. GRAHAM CO., PHOTO-LITHOGRAPHERS, WASHINGTON, D. C.

UNITED STATES PATENT OFFICE.

ALLEN DE VILBISS AND THOMAS A. DE VILBISS, OF TOLEDO, OHIO.

CLOSURE FOR FLUID-RECEPTACLES.

13,049. Specification of Reissued Letters Patent. Reissued Dec. 7, 1909.

Original No. 935,094, dated September 28, 1909, Serial No. 479,524. Application for reissue filed October 20, 1909. Serial No. 523,728.

*To all whom it may concern:*

Be it known that we, ALLEN DE VILBISS and THOMAS A. DE VILBISS, citizens of the United States, and residents of Toledo, in the county of Lucas and State of Ohio, have invented a certain new and useful Closure for Fluid-Receptacles; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to caps or closure members for bottles and other receptacles for either liquids or gases in which it is desirable to secure a tight closure, and it covers broadly the formation of a joint between two members whose contact surfaces are at an angle to each other and at least one of which surfaces is sufficiently flexible or resilient to permit it to conform to the contour of the contact surface of the other member.

The object of our invention is to provide a cap or closure of the character described in which it is possible to secure a liquid and gas tight joint without the use of ground joints or of gaskets, washers, or packing of any kind, and which at the same time is simple, cheap and durable in construction and composed of a minimum number of parts.

Our invention is especially adapted for use in connection with atomizers, nebulizers, and other instruments wherein it is impractical to provide ground joints because of the expense connected therewith and wherein it is desirable to avoid the use of washers, gaskets or packing because of their liability to become infected and the difficulty of sterilizing them without deterioration, but is not restricted to use in such connection. By the use of our invention the entire cap and bottle can be thrown into a sterilizing chamber without injury to the parts.

We do not confine ourselves to any special construction of parts for carrying out our invention, and wish to cover broadly the construction of tight joints by making one or both of the contacting surfaces of flexible or resilient material and having one of said surfaces meet the other at an angle.

The invention is fully described in the following specification, and a preferred embodiment thereof illustrated in the accompanying drawing, which is a central sectional view of our invention and associated liquid receptacle.

Referring to the drawing, 1 designates the bottle or liquid receptacle to which the cap is attached.

2 is the ferrule portion of the cap, which is preferably formed from flexible sheet metal, or other suitable material, and is shown in the present instance as being slipped over the neck of the bottle and cemented or otherwise secured thereto to form a tight joint therewith. The ferrule 2 extends upwardly for a short distance above the neck of the bottle, thence inwardly and downwardly at an incline for a short distance, forming the flexible conical contact portion or seat 3, and thence downwardly for a short distance, forming the cylindrical portion 4, in which screw threads are formed.

5 designates a plug-form of closure member for the ferrule and is provided with the reduced portion or stem 6, which is screw-threaded to correspond with the threaded portion 4 of the cap, and when used in connection with an atomizer or nebulizer, carries the air and liquid tubes, as is customary in atomizer constructions. The enlarged portion of the plug 5 forms a shoulder 7 at its inner end, which preferably stands at substantially a right angle to the body of said plug. When the stem 6 is turned into the threaded portion 4 of the cap, the rigid shoulder 7 contacts with the flexible beveled portion 3, which latter under pressure conforms to any slight irregularities in the shoulder 7, thus forming a water and gas tight joint. This construction not only forms a very efficient joint between the ferrule and plug, but the conical formation of the mouth of the ferrule materially facilitates a pouring of liquid into the bottle and eliminates recesses or sharp corners in which dirt or other matter may gather, thus making the ferrule perfectly sanitary.

We wish it understood that our invention is not limited to the specific construction and arrangement of the parts except in so far as such limitations are specified in the claims.

Having thus described our invention, what we claim as new, and desire to secure by Letters Patent, is,—

1. The combination with a fluid receptacle, of a ferrule fitted to the neck thereof and having its outer end turned inwardly and contracted at the mouth of the ferrule to form a flexible seat, a closure member for said ferrule having a shoulder coacting with said seat to form a close joint therewith, and means for drawing said member to its seat.

2. In combination, a fluid receptacle, a ferrule fitted to the neck thereof and having its outer end turned within itself and contracted adjacent to the mouth of the ferrule to form a flexible inclined seat, a closure member for said ferrule having a shoulder coacting with said inclined seat to form a close joint therewith, and coöperating means on said ferrule and member for drawing the member to its seat.

3. In combination, a fluid receptacle, a ferrule fitted to the neck thereof and having its outer end turned inwardly and contracted to form a flexible inclined seat and then extending inwardly in tubular form, and a closure member threaded into said tubular part and having a shoulder coacting with said inclined seat to form a close joint therewith.

4. In combination, a fluid receptacle, a ferrule formed of flexible material and fitted to the receptacle neck, said ferrule having its outer end turned within itself and shaped to form an inwardly inclined conical seat and a contracted cylindrical portion at the base of such seat, and a plug threaded into the cylindrical portion and having a shoulder angled relative to the incline of such seat and adapted to coact therewith to form a tight joint when the plug is screwed home.

In testimony whereof, we have hereunto signed our names to this specification in the presence of two subscribing witnesses.

ALLEN DE VILBISS.
THOMAS A. DE VILBISS.

Witnesses:
WILBUR A. OWEN,
CORNELL SCHREIBER.